United States Patent [19]

Losen

[11] Patent Number: 4,656,968
[45] Date of Patent: Apr. 14, 1987

[54] APPARATUS FOR THE DISTRIBUTION OF PUMPABLE FISH FOOD

[76] Inventor: Anders Losen, N-7096, Kvaal, Norway

[21] Appl. No.: 805,711

[22] Filed: Dec. 6, 1985

[51] Int. Cl.⁴ .............................................. A01K 5/00
[52] U.S. Cl. ................................ 119/51 R; 241/88.4; 241/236
[58] Field of Search .......................... 119/51 R, 56 R; 222/330, 272, 281, 345, 346; 418/206; 241/236, 88.4, 89.4

[56] References Cited

U.S. PATENT DOCUMENTS 3,171,359  3/1965  Spencer et al. ...................... 418/206

Primary Examiner—Hugh R. Chamblee
Attorney, Agent, or Firm—Karen M. Gerken; Martin P. Hoffman

[57] ABSTRACT

The invention provides an apparatus for the distribution of fish food wherein pumpable foodstuff enters a rotor chamber and is conducted by rotary wheels to a pressure area and then to an outlet where the foodstuff is cut into pieces having a partially flattened out shape for distribution to the feeding area.

5 Claims, 3 Drawing Figures

APPARATUS FOR THE DISTRIBUTION OF PUMPABLE FISH FOOD

The invention concerns an apparatus of the type mentioned in the introduction to patent claim 1, for the purpose of feeding pumpable foodstuff to fish.

Along with the development of seafarms for breeding fish comes a demand for the mechanization of the feeding process. An important economical factor is being able to supply the correct dosage of foodstuff, which means being able to control the amount of foodstuff and being able to supply it at various times during the day.

The use of foodstuff containers that have remote controllers, motor driven spreader systems and that are placed near the floating fish cages is already known.

As a substitute for such equipment, a new pump system has been developed which can pump the feed from a centrally located container to feeder outlets which are located at the various floating fish cages. This reduces the amount of work connected with the transport of foodstuff and also simplifies storage. But at the same time, the need arises for a device which can satisfy the demand for correct dosage while being easily controlled from land or some other central location.

The main purpose of the invention is, therefore, to create such a feeder apparatus which satisfies these demands and at the same time is simple in design as well as reliable.

The subject invention concerns an apparatus for the distribution of fish food in a seafarm for breeding fish for the purpose of feeding pumpable foodstuff to fish.

The apparatus has shown itself to be able to give a very satisfactory consistency to the foodstuff which goes through the feeder. The foodstuff is not only cut up into pieces so that the distribution to the feeding area is facilitated, but it also cuts the pieces into a flake shape which reduces the rate of sinking and thus reduces waste or loss due to sedimentation.

The details of the apparatus can be varied to provide an alternate number or shape of outlet openings. Additionally, the effects of the system can be achieved by utilizing a single rotor wheel that is supplied with foodstuff under positive pressure on one side.

Further details are explained below in conjunction with the examples illustrated in the drawings.

Figure 1:
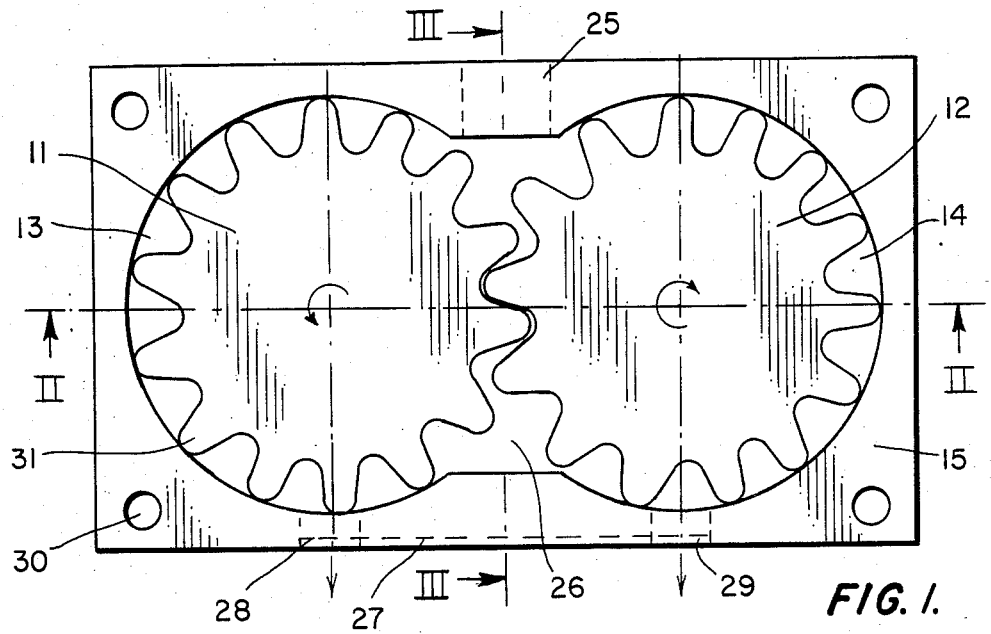
FIG. 1 shows a side view of one embodiment of the invention where the upper part of the housing around the apparatus has been omitted.
Figure 2:
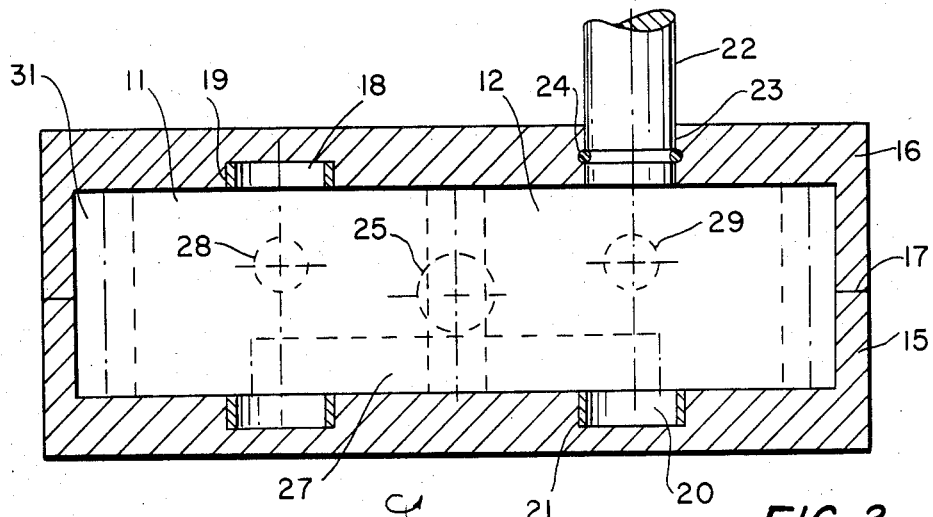
FIG. 2 shows a section at line II—II of FIG. 1.
Figure 3:
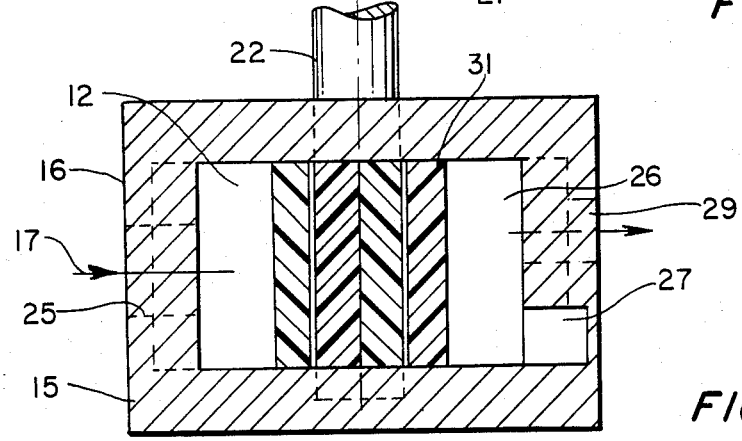
FIG. 3 shows a corresponding section at line III—III of FIG. 1.

The apparatus shown in this example, which accords to the invention, is based on a gear pump with two rotor wheels, 11 and 12 respectively, which are placed in chambers 13 and 14 respectively, in a housing which is composed of a lower half 15 and an upper half 16 which are joined together about a midplane 17 with bolts (not shown).

The one toothed rotor wheel 11 has a short shaft journal 18 protruding from each side, which is mounted in corresponding blind bore holes 19 in the adjoining housing halves 15 and 16, respectively.

The second rotor wheel 12 which is tightly meshed with the first, has a corresponding shaft journal 20, which fits into a bore hole 21 in the lower half of the housing 15. The shaft journal 22 on the other side of the rotor wheel 12 goes through a through-going bore hole 23 in the upper half of the housing 16. To provide a seal, a gasket 24 is inserted which fills a peripheral groove in the axle and a corresponding groove in the bore hole 23.

The axle 22 is connected to the drive motor in a known manner, which for example can be an electric motor.

On the side of the rotor pair 11 and 12, which because of the direction of rotation is defined as the inlet side, there is a threaded, through-going bore hole 25 in the sidewall of the housing 15,16 for connecting a supply line (not shown). This can be a pipe or hose connection to a centrally located feeder pump which conducts pumpable foodstuff from a storage container.

On the outlet side for rotor pair 11 and 12, the housing 15,16 is closed off at area 26 where a pressure increase is created by the operation of the pump and where the foodstuff is collected. This pressure area 26 communicates back to the last part of chambers 13 and 14, seen in the direction of rotation through a channel 27 which extends as a groove in the side wall of the lower half of the housing 15, approximately two tooth intervals beyond the central part of the pressure area 26. At the end of the groove 27 there is an outlet through the sidewall of the housing 15,16 with openings 28 and 29 respectively, which are located in the center at the midplane 17. Openings 28 and 29 have a sharp edge inwards towards the rotor wheels 11 and 12.

The apparatus shown is placed so that openings 28 and 29 are directed downwards where the foodstuff is to be distributed. The openings can also be directed towards the side.

In this example rotor wheels 11 and 12 with the corresponding axles are made of a suitable plastic material, for example nylon. The halves of the housing are suitably formed from stainless steel or some other corrosion resistant material. The housing halves are in this example held together by a bolt (not shown) through a hole 30 at each corner.

Opposition of the apparatus is characterized by: pumpable foodstuff being brought in through an inlet 25 so that it comes into the rotor chamber with either no or under slight positive pressure. It is then conducted by the rotating rotary wheels 11 and 12, which act as a pump, through to the pressure area 26. The pressure which is created in this area will spread through the groove 27 such that there will be enough positive pressure at the openings of outlets 28 and 29 to press the foodstuff out. At the same time that the mass of foodstuff is pressed out it will be cut into pieces by the stroke of the rotary teeth 31 past the inner edge of the outlet openings 28 and 29. The teeth 31 will at the same time have closed off part of the outlet in the otherwise circular outlet openings 28 and 29 such that the pieces of foodstuff have a partially flattened out shape, in other words diagonally flattened ends, dependent upon the consistency of the foodstuff.

The construction described above can be modified in various ways. There can be more outlet openings that the two that are shown. The shape of the outlet openings need not be circular. The groove 27 can be replaced by a groove in the bottom of one of the housing halves 15 and 16.

The apparatus that is shown can be controlled in a simle manner by a motor drive so that the correct amount and variation of foodstuff at any given time can be regulated.

It is advantageous in order to achieve proper cutting of the mass of foodstuff, that the outlet channel is relatively short. This allows the foodstuff to be cut off one piece at a time each time a tooth passes the outlet opening. If the outlet channel is too long, the viscosity and the cohesion of the foodstuff mass may cause it to come out in a continuous string, thus an important part of the purpose of the invention will be lost.

The invention can also be produced in various other ways. The principle part of the effect of the system described can be attained by using a single rotor wheel that is supplied with foodstuff under positive pressure on the one side, and where the outlet consisting of one or several outlet openings with a short outlet channel goes out along the axis of the other. The rotor wheel can here, too, be driven by a motor so that the regulating effect can be achieved.

I claim:

1. An apparatus for distributing fish foodstuff in a seafarm for breeding fish comprising a housing, a gear pump disposed in said housing, said gear pump including a rotor chamber and at least one pump gear disposed within said chamber, said pump gear being adapted to be rotated, at least one feeder opening provided in said housing, a pressure area defined by said rotor chamber and at least one relatively sharp-edged outlet opening provided in said housing, said outlet opening being a short outlet channel primarily radially arranged out from said rotor chamber, said pressure area being connected with said rotor chamber at said outlet opening, said pump gear being adapted to stroke across said outlet opening.

2. The apparatus as recited in claim 1 wherein said feeder opening is primarily radially arranged out from said rotor chamber.

3. The apparatus as recited in claim 1 wherein said pressure area is connected with said rotor chamber at said outlet opening by means of a groove provided in said housing, said groove being primarily radially arranged on the outer side of said rotor chamber.

4. The apparatus as recited in claim 1 wherein said feeder opening and said outlet opening are located axially on opposite sides of said pump gear.

5. The apparatus as recited in claim 1 wherein said pump gear is provided with teeth.

* * * * *